(12) United States Patent
Buysman et al.

(10) Patent No.: US 6,789,371 B1
(45) Date of Patent: Sep. 14, 2004

(54) TAPELESS SEAL BAR ASSEMBLY

(76) Inventors: Jeffrey L. Buysman, 1301 Briarwood Dr., Worthington, MN (US) 56187; Thomas E. Bomgaars, R.R. 1, Box 25, Worthington, MN (US) 56187

( * ) Notice: Subject to any disclaimer, the term of this patent is extended or adjusted under 35 U.S.C. 154(b) by 0 days.

(21) Appl. No.: 09/552,202

(22) Filed: Apr. 19, 2000

Related U.S. Application Data
(60) Provisional application No. 60/130,222, filed on Apr. 20, 1999.

(51) Int. Cl.[7] ............................................. B65B 51/10
(52) U.S. Cl. .................. 53/373.7; 53/373.8; 53/374.8; 53/550; 53/554
(58) Field of Search ........................... 53/373.7, 373.8, 53/550, 551, 559, 374.8; 219/633, 765

(56) References Cited

U.S. PATENT DOCUMENTS

| | | | |
|---|---|---|---|
| 3,680,207 A | * 8/1972 | Belmonte et al. ........ 219/468.1 |
| 3,912,575 A | * 10/1975 | Zeinick ...................... 156/515 |
| 4,045,272 A | 8/1977 | Lombardi ................... 156/380 |
| 4,062,718 A | 12/1977 | Hay, II ....................... 156/498 |
| 4,075,818 A | 2/1978 | Wright et al. ................. 53/180 |
| 4,223,513 A | * 9/1980 | Mahaffy et al. ............ 534/432 |
| 4,292,118 A | 9/1981 | Wyslotsky ............... 156/583.2 |
| 4,296,588 A | 10/1981 | Vetter ............................ 53/86 |
| 4,545,177 A | * 10/1985 | Day ............................. 53/434 |
| 5,019,027 A | * 5/1991 | Boeckmann et al. ....... 493/209 |
| 5,239,808 A | * 8/1993 | Wells et al. ................ 53/373.7 |
| 5,321,230 A | * 6/1994 | Shanklin et al. ............ 156/515 |
| 5,389,184 A | 2/1995 | Jacaruso et al. ............ 156/378 |
| 5,403,427 A | 4/1995 | Wilcox ........................ 156/359 |
| 5,488,897 A | * 2/1996 | Snyder ......................... 99/445 |
| 5,638,664 A | * 6/1997 | Levsen et al. ............. 53/372.6 |
| 5,682,732 A | 11/1997 | Selberg ........................ 53/477 |
| 5,755,076 A | * 5/1998 | Otsuka ...................... 53/373.7 |
| 6,348,679 B1 | * 2/2002 | Ryan et al. .................. 219/634 |

\* cited by examiner

*Primary Examiner*—Scott A. Smith
*Assistant Examiner*—Hemant M. Desai
(74) *Attorney, Agent, or Firm*—Dicke, Billig & Czaja, PLLC (57) ABSTRACT

A packaging machine including a seal bar assembly for bonding layers of polymeric material together about a wrapped product to form an airtight package seal comprises a length of SILVERSTONE encapsulated, flat electrical resistance heating ribbon disposed upon a rigid seal bar having a smooth face surface. The seal bar is preferably constructed of thermally conductive and electrically insulating materials, such as virgin TEFLON. The heating ribbon is mounted onto the seal bar under nearly constant tension throughout its temperature range. Low resistance electrical leads provide a path for supplying electricity to the heating ribbon. A silicon rubber-backed seal bar mating assembly for providing pressure to the polymeric materials during bonding is disclosed.

7 Claims, 10 Drawing Sheets

TAPELESS SEAL BAR ASSEMBLY

CROSS REFERENCE TO RELATED APPLICATIONS

This Non-Provisional Utility Application claims the benefit of the filing date of U.S. Provisional Application Serial No. 60/130,222 filed Apr. 20, 1999, entitled "Tapeless Seal Bars."

THE FIELD OF THE INVENTION

The present invention generally relates to packaging machines, and more particularly to packaging machines having seal bars assemblies using electrical resistance impulse heating to form a bond in polymeric material.

BACKGROUND OF THE INVENTION

Packaging machines are used for sealing a product in an air-tight package. Packages are often constructed of polymeric material. The product to be packaged is placed, by hand or machine, within a bag, a tube or between several sheets of packaging material, then the packaging material openings are sealed closed. Air may or may not be trapped within the package along with the product. A vacuum packaging machine evacuates substantially all the air between the product and the packaging material before sealing. Vacuum packaging is used to reduce package volume and, in the case of perishable product, preserve freshness.

Various techniques are utilized for bonding together layers of polymeric packaging material. One device to effect polymeric bonding is an impulse heating apparatus, or seal bar assembly. The surfaces of polymeric material to be sealed are placed adjacent to each other and in contact with the seal bar assembly. Application of pressure and sufficient heat partially melts and bonds the surfaces of the polymeric material together to form a seal. Cooling stabilizes the bond.

Conventional seal bars are generally constructed of a metallic block having smooth face mating surface. A flat, electrically resistive wire is disposed on a seal bar assembly smooth face surface. Another bar, opposing the seal bar, applies pressure to hold the packaging material in contact with the seal bar. Heat is generated by passing sufficient electricity through the sealing wire for a period of time (dwell time) until the wire reaches a desired temperature. Heat is transmitted from the sealing wire to the packaging material to thermally bond the surfaces of the polymeric material to each other. Electricity is removed from the seal wire and the package is allowed to cool, stabilizing the bond. Contact pressure is relieved and the sealed package is removed from the seal bar to complete a package sealing cycle. The conventional sealing wire is a discrete electrically resistive heating element, but may also be integrally formed onto the surface of the seal bar.

Reducing package sealing cycle time increases efficiency and reduces the cost of packaging. One method to reduce package sealing cycle time is to cool, and thus stabilize, the bond more quickly. Forming the seal using only the minimum heat necessary is desirable, so that time to dissipate heat in excess of bond-forming heat is avoided. However, if too little heat is input, bond quality will decline. Quickly conducting heat away from a completed bond also decreases cool-down time. The seal bar preferably acts as a heat sink to remove heat generated by the sealing wire from the area of the bond after the seal is formed. Therefore, the seal bars are constructed of material possessing efficient thermal conductivity properties.

The conventional seal bar is constructed of aluminum. Aluminum is relatively easy and inexpensive to manufacture. Aluminum possesses desirable heat conduction properties and can be machined to a smooth surface, impervious to moisture and bacteria. Heat is conducted via the seal bar to a cooler ambient environment or to a heat removal fluid (liquid or gas) passed through the seal bar itself.

Conventionally, a layer of insulating material is disposed between the sealing wire and the electrically conductive metallic (i.e., aluminum) seal bar to prevent shorting of the electrical heating circuit. One common method to provide such electrical insulation is to dispose a thin, adhesive-backed TEFLON tape adhered to the metallic seal bar smooth face surface. The sealing wire is subsequently disposed onto the non-adhesive side of the TEFLON tape.

A thin layer of release coating material is conventionally disposed over the outer surface of the sealing wire to prevent the polymers of the polymeric material from sticking to the hot sealing wire, commonly known as "poly prick." Poly prick decreases the integrity of the polymeric packaging material bond due to the loss of polymeric material extracted by the sealing wire from the joint area.

Additionally, over time, the sealing wire heat transfer capability is reduced in isolated regions along the sealing wire due to the insulating presence of melted polymeric materials adhering to the wire. Bond integrity is subsequently reduced in these regions if insufficient heat is transferred to the packaging material in these areas. Alternatively, if sealing wire temperatures are increased to compensate for the isolated areas of seal wire insulation due to poly prick, un-insulated areas of the seal wire can overheat, burning or otherwise damaging the polymeric material. One conventional method of preventing poly prick is to place another layer of TEFLON tape over the hot sealing wire to form another smooth face surface on the seal bar. The TEFLON is disposed, adhesive side towards the sealing wire, between the sealing wire and the polymeric packaging material to be bonded.

The sealing wire is conventionally constructed from a metal or metallic alloy such as silver or nickel alloy. The long, flat sealing wire thermally expands and contracts as it heats and cools during each impulse heat sealing cycle. The cyclic expansion/contraction stress the sealing wire.

Areas along the sealing wire experiencing differential heat transfer rates due to the presence of polymeric material on the sealing wire from poly prick. Polymeric material on the sealing wire insulates the sealing wire reducing heat transfer from the sealing wire to the packaging material, creating sealing wire hot spots. "Hot" and "cold" regions exist along the sealing wire due to difference in thermal transfer characteristics. Additional thermal stress exists between the "hot" and "cold" regions along the sealing wire.

The thermal expansion/contraction cycles also cause the sealing wire to mechanically creep during each cycle. This sealing wire movement creates wear of the insulating TEFLON tape as the sealing wire moves relative to the TEFLON tape. If the TEFLON tapes wear through, electrical insulation is lost, the sealing wire shorts out and losses ability to generate heat, and thus losses the ability to form a bond in the polymeric material along the entire length of the desired seal.

Along with the mechanical movement of the sealing wire imparted to the TEFLON tapes, the TEFLON tapes also undergo thermal expansion/contraction cycles as heat from the sealing wire is imparted to the layers of TEFLON tape by conduction. The TEFLON tapes frequently bunch during sealing operations using conventional seal bar and seal bar mating block assemblies.

TEFLON tape bunching is deleterious to seal quality. TEFLON tape bunching creates peaks and valleys in the surface of the seal and mating bars, resulting in uneven application of pressure. Once the TEFLON tape bunches, the adhesive-backing releases and the TEFLON tape can overlap itself. Furthermore, conduction of heat from the sealing wire through the TEFLON tape disposed between the sealing wire and the polymeric material varies between the peaks, valleys and increased thickness of overlapped areas of the bunched TEFLON tape. Due to the varying degrees of contact between the polymeric materials and the seal bar, and the varying heat transfer characteristics of the TEFLON tape, bond strength varies along the joint, and quality is thus reduced (seal integrity is only as good as the weakest point along the seal).

Bunching of one TEFLON tape tends to mechanically cause the other TEFLON tapes in close contact to also bunch up. Therefore, bunched TEFLON tapes must be removed and replaced along with the sealing wire disposed therebetween. TEFLON tape replacement requires removing the offending seal bar assembly from service, reducing efficiency and increasing costs. Package machine down time, maintenance labor costs and replacement part costs (TEFLON tapes and sealing wires) further increase costs associated with packaging machines employing conventional seal bar assembly and seal bar mating assembly. A seal bar assembly cycling 30 to 40 times per minute, 16 hours per day typically requires TEFLON tape and sealing wire replacement 2 or 3 times per day.

However, due to the need to heat the polymeric material through a layer of TEFLON tape, and the aforementioned additional heat transfer problems of bunched TEFLON tape, often conventional seal bar assemblies are upgraded at significant cost to use dual sealing wires. Dual sealing wires are capable of generating increased heat levels, i.e., the sealing wire can experience a broader range of operating temperature. The severity of thermal expansion/contraction cycles is likewise increased across a broader temperature range, leading to more rapid TEFLON tape failures.

Dual sealing wire installation require approximately double the energy input as the single sealing wire application since the resistance of the heating element is effectively doubled. Upgrading from a single to a dual sealing wire seal bar assembly typically includes the expense of supplementing the power supply capability of the packaging machine to accommodate the increased seal bar assembly power usage. Operating costs are proportionately higher with higher energy usage. Maintenance costs, replacement part costs and labor costs are all increased as well due to the effects of a higher magnitude thermal expansion/contraction cycling.

While capital, direct operating and maintenance costs are typically less for a single sealing wire versus a dual sealing wire configuration, seal quality is lower for a package sealed with a single sealing wire. Increased costs can result due to increased repackaging or spoilage costs from faulty seals. Labor to repackage, package material costs and lost capacity to package "new" product all contribute to the costs associated with faulty sealing operations.

Dual sealing wire configurations essentially form two adjacent bonds. In one typical conventional embodiment, the dual electrical resistive heating elements (sealing wires) are energized in series at a higher voltage, rather than in parallel at a higher current. This requires separation between the adjacent heating wires/ribbons since some voltage difference between the individual dual heating wires/ribbons exists everywhere along the seal bar. An electrical short circuit and loss of some heating area along the seal bar assembly results if the dual heating elements are located too close together.

When liquid is present in the bond area between the dual sealing wires, as is the case for moist products such as meat, the sealing wires must supply the additional energy necessary to heat the liquid, along with the polymeric material, to a temperature sufficient to form a bond. Significant energy is lost to vaporize the liquid since the requisite bond-forming temperature typically exceeds the boiling point of the trapped liquid. As the liquid vaporizes, the gas under pressure becomes trapped between the dual bonds, tending to force the layers of polymeric material apart.

A low resistance electrical lead is coupled to each end of the sealing wire providing a path to supply electrical power to the seal bar assembly. The electrical leads are provided with a spring loaded clip at one end for quick coupling to a power source terminals located on the packaging machine. In the conventional single sealing wire seal bar assembly, the seal wire spans the length of the seal bar. One short electrical lead is coupled to the sealing wire end located at each end of the seal bar. A conventional packaging machine provides a power source terminal within a short distance from each end of the seal bar.

When a seal bar assembly is upgraded to provide a dual sealing wire configuration however, the two sealing wires span the length of the seal bar and are electrically coupled together on one end of the seal bar. The dual sealing wires are effectively connected in series with each other. At end of the seal bar opposite the junction between the dual sealing wire elements, an electrical lead is coupled to each of the remaining ends of the dual seal wires. Therefore, one short and one longer electrical lead are necessary to reach the conventional packaging machine power source terminals. The longer electrical lead is approximately 16 inches long and more susceptible to damage such as nicks, cuts, and pinching under the seal bar.

Figure 4:
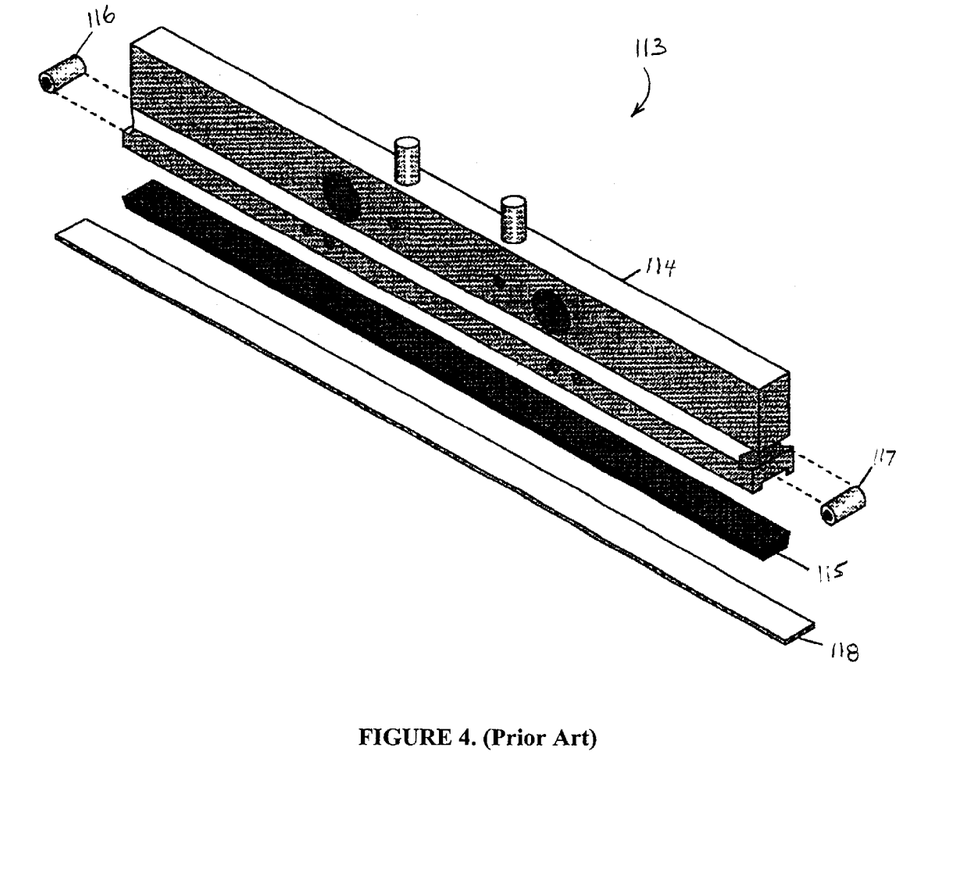
FIG. 4 is an exploded perspective view of a conventional mating block assembly having a TEFLON tape mating surface.

FIG. 4 illustrates a conventional seal bar mating assembly having a rigid base and preferably, a substantially planar contour is used to apply pressure to the packaging materials in order to keep them in contact with the seal bar assembly during sealing operations. A rubber layer is disposed onto a rigid base to form the mating block. A thin, adhesive-backed TEFLON tape layer is adhered onto the rubber layer to form a mating surface of the mating block. A reciprocating means is used to bring the smooth face surface of the seal bar assembly towards the mating surface of the seal bar mating assembly during sealing operations with the polymeric material to be sealed disposed therebetween. The seal bar mating assembly TEFLON tape can also bunch preventing the application of uniform pressure to the polymeric material and accompanying decrease in bond quality.

In view of the above, there is a need for a seal bar assembly and seal bar mating assembly which do not require the use of TEFLON tapes. Eliminating the use of TEFLON tapes and the maintenance costs associated with bunching thereof and electrical shorting of sealing wire is desirable. An improved seal bar assembly is preferably compatible with existing packaging equipment, utilizes a single sealing wire to eliminate power supply upgrade capital costs, reduces energy costs and yields consistent, high quality bonds in polymeric materials.

SUMMARY OF THE INVENTION

The present invention generally relates to packaging machines, and more particularly to packaging machines having seal bars assemblies using electrical resistance impulse heating to form a bond in polymeric material.

A seal bar assembly is disclosed comprising a seal bar having a smooth face surface, a length of electrical resistance heating element, and a layer of electrical insulation disposed around the perimeter of a center portion of the length of the electrical resistance heating element, the length of insulated electrical heating element disposed upon the seal bar smooth face surface.

In one embodiment, the electrical resistance heating element is preferably flat, and more preferably configured as a double seam band. The electrical resistance heating element is preferably coated with TEFLON and/or SILVERSTONE except for its ends which are preferably copper plated. Low resistance electrical leads are coupled to the ends of the electrical resistance heating element.

In one embodiment, the seal bar is preferably formed from virgin TEFLON, or alternately metal coated with TEFLON or SILVERSTONE. In one embodiment, the electrical resistance heating element is mounted onto the seal bar using a constant tension mechanism.

A seal bar mating assembly is disclosed using a layer of silicon rubber to eliminate the need for using TEFLON tape. A improved packaging machine using the seal bar assembly of the present invention is provided.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
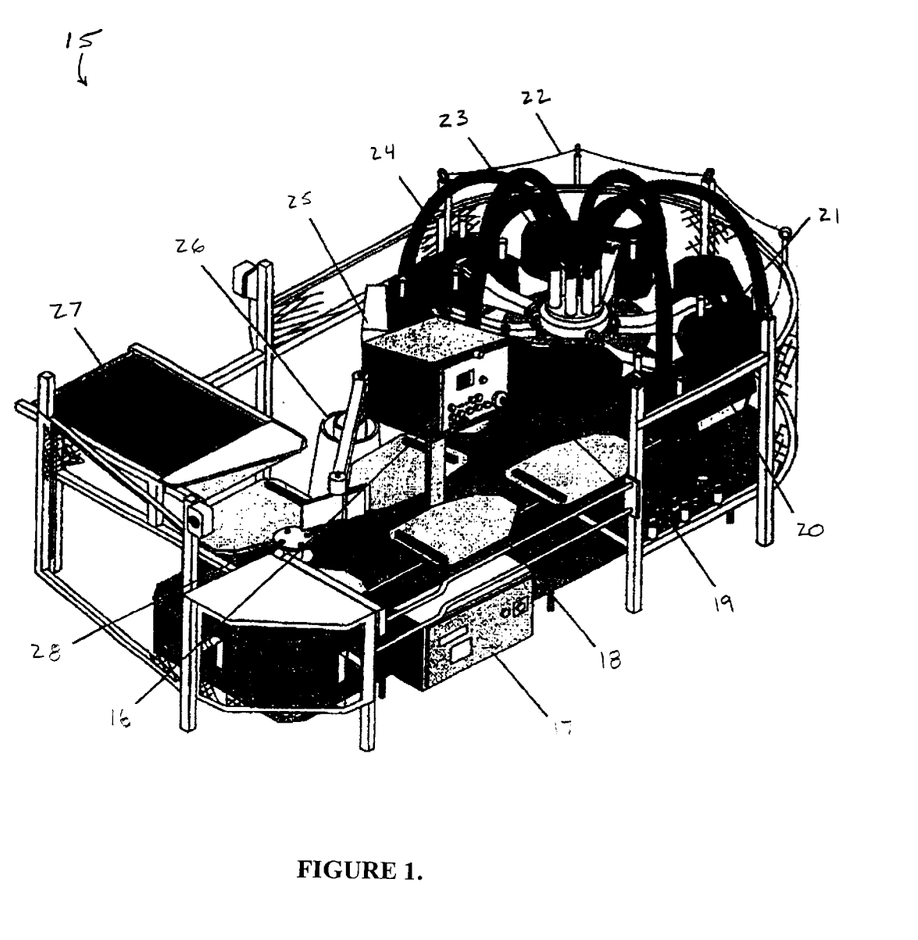
FIG. 1 is a perspective view of a conventional rotary vacuum chamber packaging machine.

FIG. 1 shows one exemplary embodiment of the present invention, a vacuum packaging machine having multiple sealing stations utilizing seal bar assemblies of the present invention disclosed herein, arranged on a rotary mechanism. A vacuum packaging machine, indicated generally at 15, includes an operator's control panel 16, a main electrical box 17, a platen 18, an air regulator 19, at least one evacuation chamber 20, at least one seal seat diaphragm 21, a safety cord 22, a rotary valve 23, at least one vacuum hose 24, a scrap collector 25, a discharge assembly 26, a discharge conveyor 27 and a return sprocket 28. Further detail of this embodiment is provided in the Cryovac 8600-14EL Rotary Vacuum Chamber Machine Equipment Manual incorporated by reference into this application.

Figure 2:
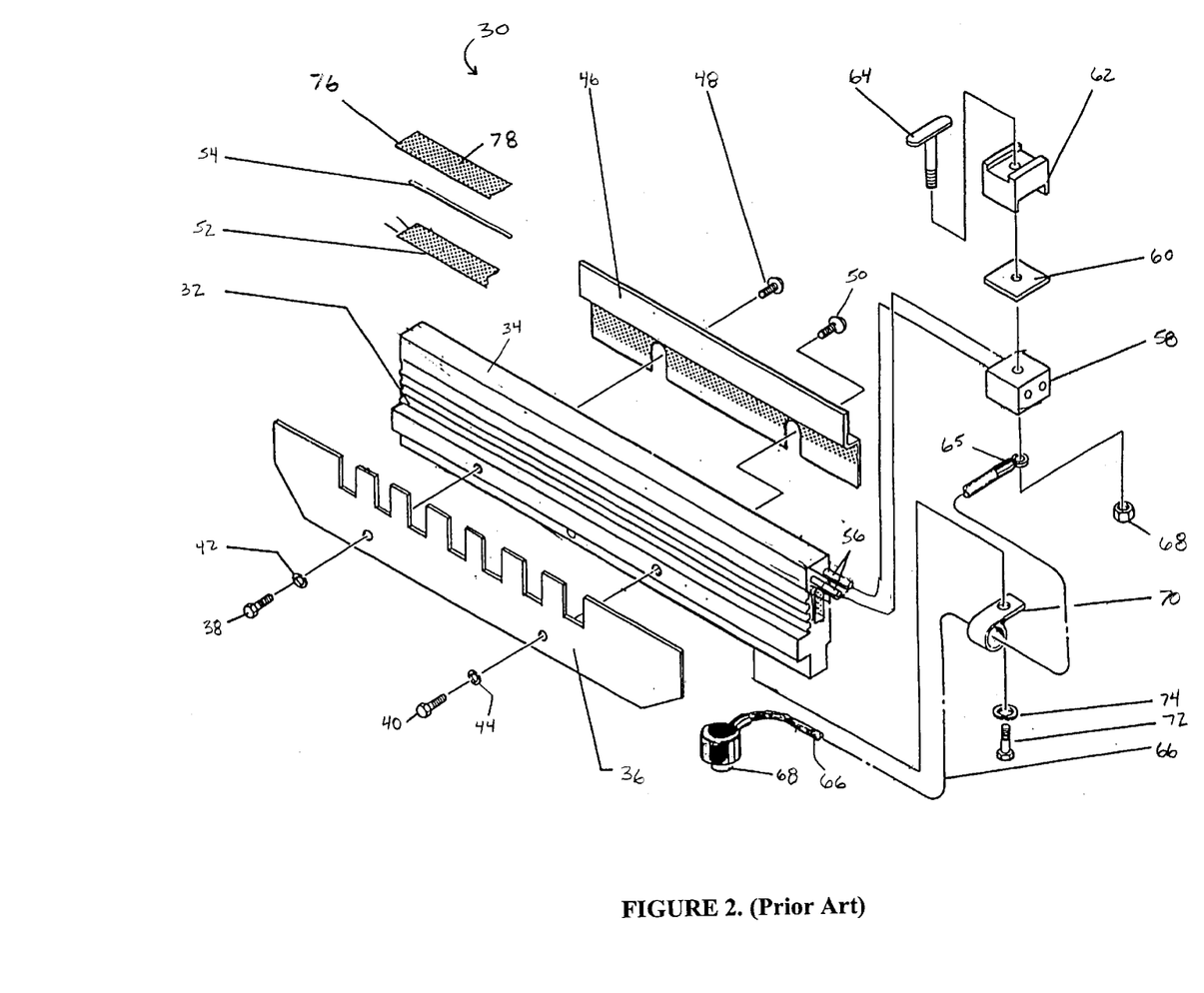
FIG. 2 is an exploded perspective view of a conventional seal bar assembly having a single seal wire.

Referring to FIG. 2, a conventional seal bar assembly with a single sealing wire is shown generally at 30. A seal bar 32 provides a smooth face surface 34. A film support 36 is attached to one side of seal bar 32 via bolts 38 and 40 through spring washers 42 and 44 secured into the body of seal bar 32. A plate 46 is attached to the other side of seal bar 32 via mushroom head screws 48 and 50 secured into the body of seal bar 32. A first TEFLON coated fiberglass tape 52 is affixed to smooth face surface 34. TEFLON tape 52 is adhesive-backed for this purpose. Sealing wire 54 is dispose on top of first TEFLON tape 52.

Two pins 56 extend from each end of seal bar 32 (only one end is shown in FIG. 2). Slide 58 is placed over pins 56 such that pins 56 extend through slide 58. Seal wire 54 is longer than seal bar 32. The ends of seal wire 54 extend over the top of slide 58. Slide 58 allows the ends of sealing wire 54 to move as sealing wire 54 expands and contracts from heating and cooling respectively. A clamp support 60 is placed over sealing wire 54 and slide 58. A clamp 62 is placed over clamp support 60 and a pivot bolt 64 is disposed into the aligned apertures through clamp 62, clamp support 60, and slide 58. A ring terminal 65, located on one end of a low resistance electrical lead 66, is placed onto the shank of pivot bolt 64 and secured by a nut 68. Nut 68 is tightened onto pivot bolt 64 to apply pressure to the stack of elements and establish electrical continuity between sealing wire 54 and electrical lead 66. At the other end of electrical lead 66 is a female spring clip terminal 68. Electrical lead 66 passes through a bundling strap 70 which is attached to the body of seal bar 32 via bolt 72 through spring washer 74.

A second TEFLON coated fiberglass tape 76 is affixed over sealing wire 54, with its adhesive backing towards sealing wire 54 and its TEFLON surface facing upwards, away from sealing wire 54. Sealing wire 54 is shaped as a flat ribbon. The TEFLON (i.e., non-adhesive) surface of second TEFLON tape 56 forms a smooth face surface 78.

Figure 3:
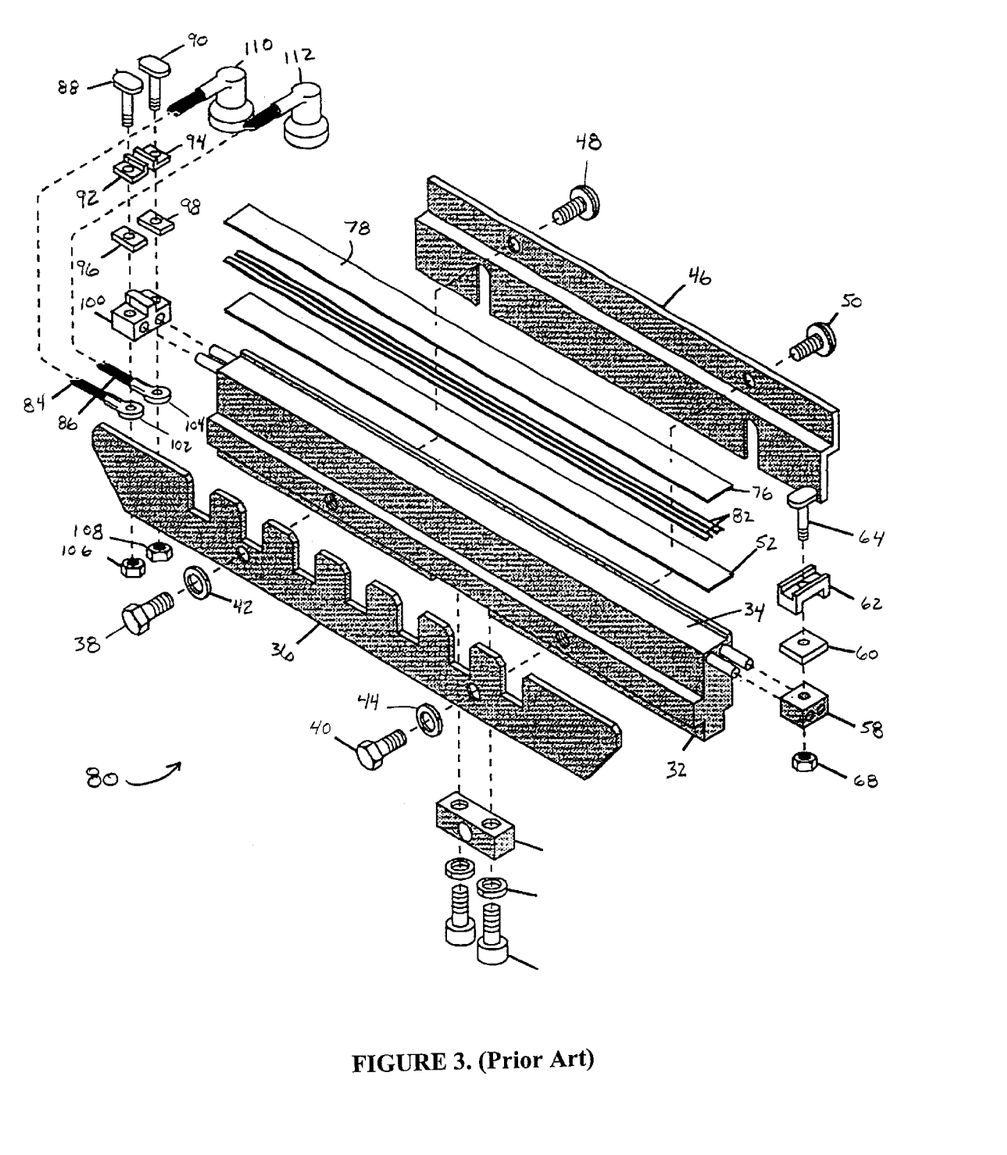
FIG. 3 is an exploded perspective view of a conventional seal bar assembly having a dual seal wire.

Referring to FIG. 3, a conventional seal bar assembly with a dual sealing wire is shown generally at 80. Construction of dual sealing wire seal bar assembly 80 is similar to that of the single sealing wire seal bar assembly 30 with several exceptions. First, a dual element sealing wire 82 is disposed between first TEFLON tape 52 and second TEFLON tape 76. Also, electrical connections to dual element sealing wire 82 are slightly different from the single sealing wire configuration.

As shown in FIG. 3, electrical connections are both made at a one end of seal bar assembly 80. Pivot bolt 64, clamp 62, clamp support 60 and nut 68 are attached to one end of seal bar assembly 80 but without passing through ring terminal 65. In this manner, electrical continuity is established from one element to the other of dual element sealing wire 82. Effectively, the two electrical resistive sealing wire elements 82 are connected in series to each other.

At the other end of seal bar 80, electrical leads 84 and 86 are coupled to the ends of dual sealing wire 82 using pivot bolts 88 and 90, through clamps 92 and 94, then clamp supports 96 and 98, dual slide 100 and respective ring terminals 102 and 104. Nuts 106 and 108 secure the electrical connections. The separate ends of dual sealing wire 82 are physically and electrically isolated from each other. The ends of dual sealing wire 82 are compressed between dual slide 100 and clamp supports 96 and 98 respectively to establish electrical continuity through pivot bolts 88 and 90 respectively to electrical leads 84 and 86 respectively. At the ends of electrical leads 84 and 86, opposite ring terminals 102 and 104, are female spring clip terminals 110 and 112 respectively.

All of the novel features of the present invention, either alone or in combination, can be applied to the conventional structure exemplified in FIGS. 2 and 3.

FIG. 4 illustrates a conventional seal bar mating assembly, generally indicated at 113 comprising a body 114, a rubber layer 115 attached with a friction fit using tubes 116 and 117. A layer of TEFLON tape 118 is adhered to the rubber layer.

Figure 5:
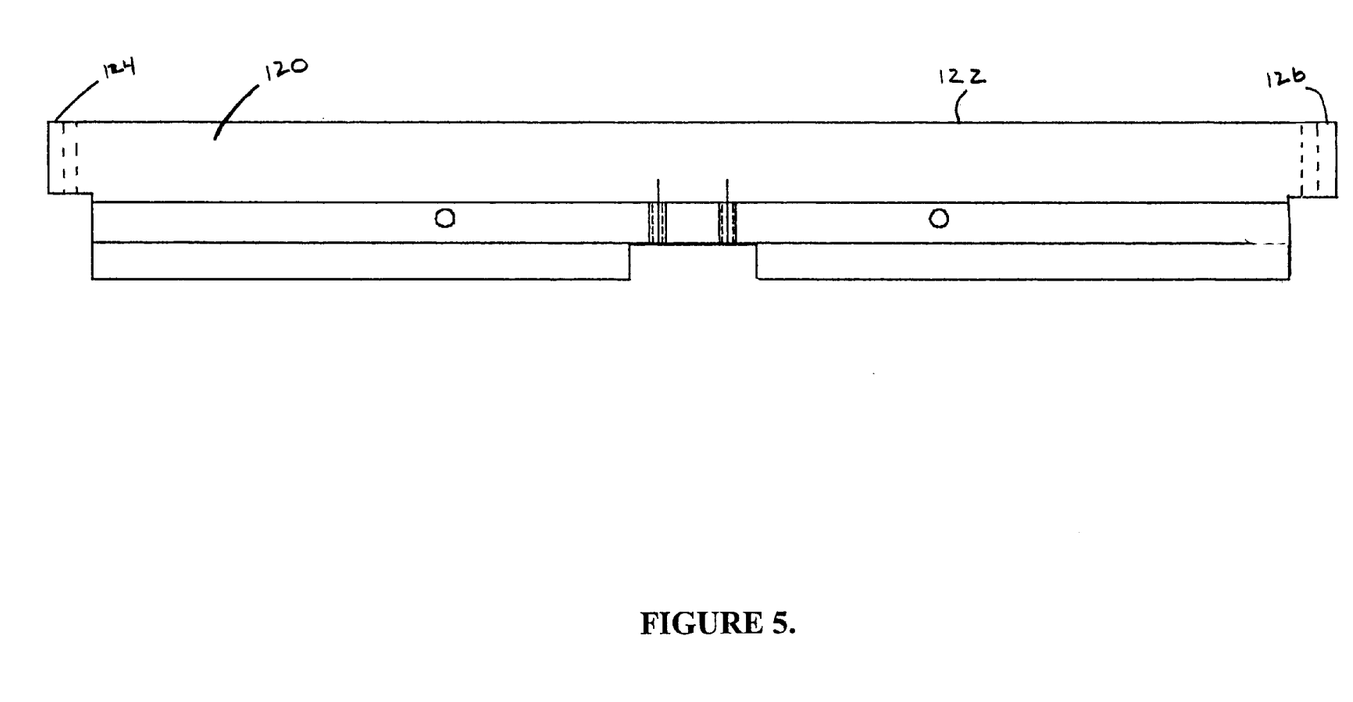
FIG. 5 is a side view of a one embodiment of a seal bar assembly of the present invention.

The present invention simultaneously overcomes the disadvantages of conventional single and dual sealing wire, seal bar assemblies. One embodiment of a seal bar of the present invention is shown in FIG. 5 at 120. Its shape is similar to the conventional seal bar (e.g., seal bar 32 in FIG. 2). The pins extending from the ends of a conventional seal bar upon which slides are mounted are replaced by fixed seal bar extensions 124 and 126 in one embodiment of the present invention. Seal bar extensions 124 and 126 are integral to seal bar 120. Seal bar 120 has a smooth face surface 122. Seal bar 120 is formed or machined from material which is rigid and thermally conductive, such as aluminum or other metals and alloys.

Seal bar 120 is preferably formed or machined from material which is rigid, thermally conductive and electrically insulating. Seal bar 120 can be formed from materials such as fiberglass or ceramics by conventional methods. However, when applied in food processing applications, seal bar 120 must be impervious to moisture and bacteria. Material selection in such applications is limited to those approved by the Food and Drug Administration (FDA) for direct food contact.

In a preferred embodiment, seal bar 120 is machined from polytetra fluoroethylene, commonly known as TEFLON which simultaneously satisfies thermal conductivity, electrical insulation and FDA approval for direct food contact. Virgin TEFLON is a preferred material since it is rigid and impervious to liquid and bacteria. Additionally, the white color of virgin TEFLON is desirable in food processing applications in order to assess cleanliness. Virgin TEFLON withstands, without absorption, the cleaning chemical solutions well known to those skilled in the art, regularly used to sanitize food processing equipment. In an alternative embodiment, seal bar 120 is formed from a metallic substructure coated with either black TEFLON and/or SILVERSTONE. In a further alternative embodiment, seal bar 120 is formed by laminating, or otherwise joining, a layer of virgin TEFLON to a metallic substructure.

Figures 6, 6A:
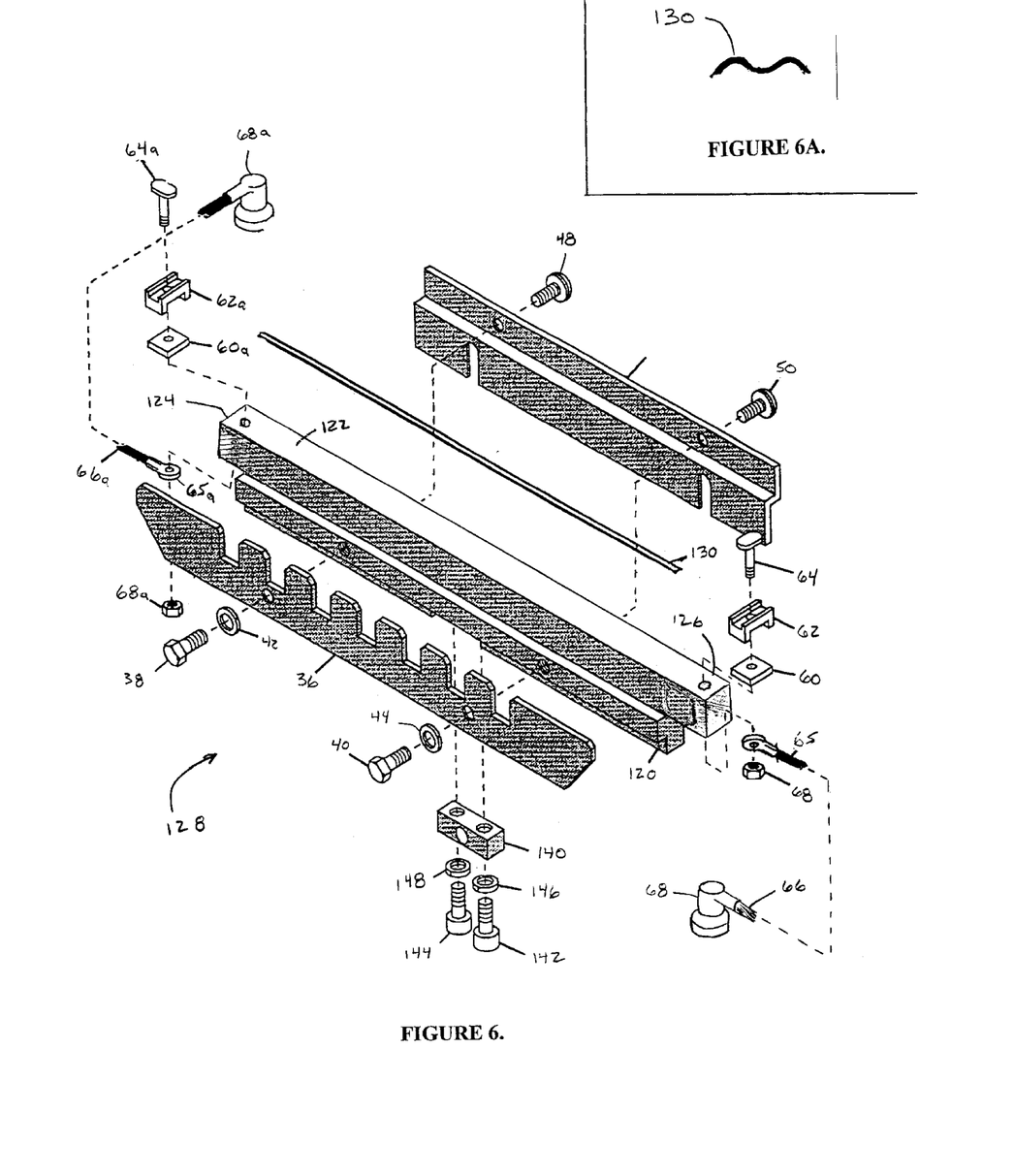
FIG. 6 is an exploded perspective view of one embodiment of a seal bar assembly of the present invention.
FIG. 6A is an end view of a double seam band sealing wire of the present invention.

One embodiment of a seal bar assembly of the present invention is illustrated generally at 128 in FIG. 6. Film support 36 is attached to one side of seal bar 120 via bolts 38 and 40 through spring washers 42 and 44 secured into the body of seal bar 120. Plate 46 is attached to the other side of seal bar 120 via mushroom head screws 48 and 50 secured into the body of seal bar 120. No first TEFLON coated fiberglass tape is necessary with seal bar 120 of the present invention since seal bar 120 is constructed entirely of TEFLON.

A single sealing wire 130 is used in the present invention. Sealing wire 130, an electrical resistive heating element, is conventionally formed of metal, such as silver, or metal alloy, such as a nickel alloy. In a preferred embodiment, sealing wire 130 is formed as a flat, or nearly-flat ribbon. More preferably, sealing wire 130 is configured as a double seam band. An end view of sealing wire 130 configured as a double seam band is shown in FIG. 6A. Alternative embodiments of sealing wire 130 include tapered-edge, reflex, beaded, t-profile and zebra configurations.

A double seam band is a single electrical resistive heating element but is shaped as a shallow upside-down "W" with the "peaks" of the inverted "W" facing the polymeric material to be sealed. The double-seam-band-shaped sealing wire 130 has the advantages of two discrete adjacent seams (i.e., dual redundant bonds) without sufficient space between the bonds to trap liquids or gases and the associated disadvantages thereof. Double-seam-band-shaped sealing wire 130 is approximately 0.25 mm thick. In one embodiment, the total length of sealing wire 130 is approximately 19.8875 inches.

One or more layers of electrical insulation material is disposed around the perimeter of seal wire 130 across the center section. Only two small lengths of sealing wire 130 at the ends is left un-coated, just enough to provide an electrical connection. In the embodiment illustrated in FIG. 6, approximately 1.1875 inches at each end of sealing wire 130 is un-coated. The un-coated ends of sealing wire 130 are copper plated to remain cool during the sealing process prolonging sealing wire 130's life.

The electrical insulation material encasing sealing wire 130 must also be an efficient thermal conductor and, in food processing applications, FDA-approved for direct food contact. The thermal conductive/electrical insulation material preferred is black TEFLON, and more preferably, SILVERSTONE. Black TEFLON or SILVERSTONE are applied to sealing wire 130 by conventional methods similar to those used to manufacture cooking utensils and pans. In an alternative embodiment, black TEFLON and SILVERSTONE are both applied to encase sealing wire 130.

Because sealing wire 130 is coated with SILVERSTONE, TEFLON tape applied over the sealing wire of a conventional seal bar assembly is not required in the present invention to prevent poly prick (the sticking of the molten polymeric materials to sealing wire 130). Black TEFLON is harder, more durable and thus, longer lasting. SILVERSTONE however, is preferred due to its superior release (i.e., non-stick) characteristics, thus resulting reduced poly prick occurrence than black TEFLON.

Sealing wire 130 is mounted onto seal bar 120 and electrically coupled to low resistance electrical leads (and ultimately to a source of electrical power) similarly to the method employed by the conventional seal bar assembly having a single sealing wire. Pivot bolt 64 is extended through clamp 62, clamp support 60, then through an aperture in seal bar 120 (rather than a slide) and ring terminal 65 on one end of low resistance electrical lead 66. Pivot bolt 64 is secured with nut 68 to apply a pressure fit to seal wire 130 disposed between seal bar extension 126 and clamp support 60. A similar connection is made on the opposite end of sealing wire 130 using pivot bolt 64a, clamp 62a, clamp support 60a, ring terminal 66a and nut 68a.

Also shown in FIG. 6 is mounting block 140 used to mount seal bar assembly 128 onto a packaging machine. Mounting block 140 is attached to seal bar 120 by means of screws 142 and 144 through washers 146 and 148 passing through mounting block 140.

Figure 7:
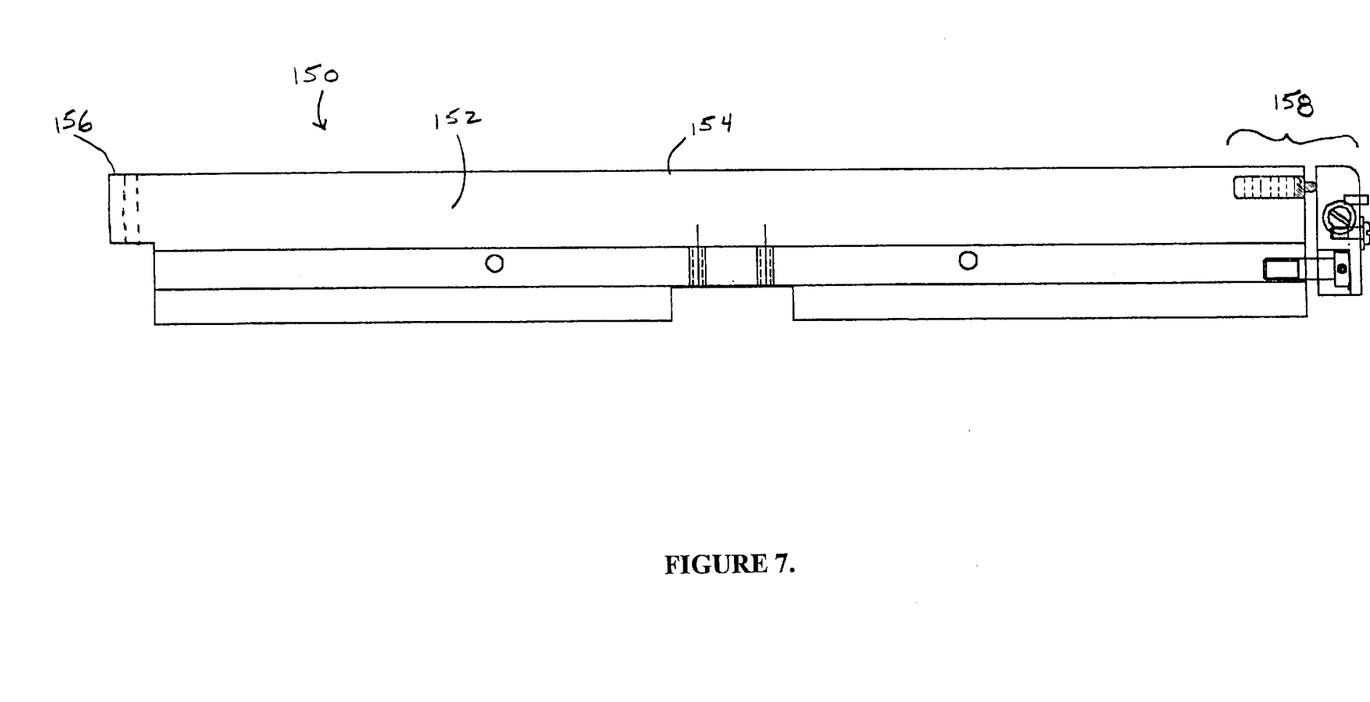
FIG. 7 is a side view of a preferred embodiment of a seal bar assembly of he present invention with a tension mechanism.

FIG. 7 illustrates another embodiment of a seal bar assembly of the present invention, generally illustrated at 150. A seal bar 152, made of virgin Teflon, having a smooth face surface 154 is provided. In an alternative embodiment, seal bar 152 is formed from a metallic substructure coated with either black TEFLON or SILVERSTONE. In a further alternative embodiment, seal bar 152 is formed by laminating, or otherwise joining, a layer of virgin TEFLON to a metallic substructure.

Seal bar 152 has only one extension 156. At the other end of seal bar 152, a tension mechanism 158 is shown. Tension mechanism 158 is used to mount sealing wire 130 (not shown in FIG. 7) to provide constant tension to seal wire 130 throughout a cold and hot temperature range of approximately 50 degrees Fahrenheit to 500 degrees Fahrenheit. Maintaining constant tension on sealing wire 130 as it thermally expands and contracts increases sealing wire 130's life.

Figure 8:
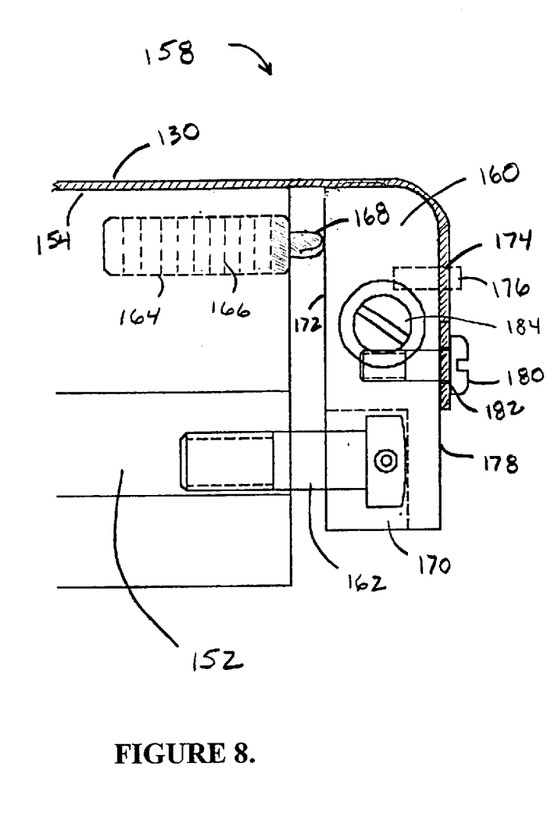
FIG. 8 is a side view of the tension mechanism for a seal bar assembly of the present invention in an un-tensioned condition.

FIG. 8 further illustrates a side view of tension mechanism 158. A mounting block 160 is provided. Mounting block 160 is formed from materials similar to seal bar 152. Bolt 162 is secured into the end of seal bar 152. The head of bolt 162 extends therefrom. Within a recess 164 extending internally from the end of seal bar 152, a spring 166 is disposed. A pin 168 is disposed partially within recess 164, adjacent to spring 166. Pin 168 extends outside of recess 164, protruding from the end of seal bar 152 with spring 166 in a non-compressed state. Depressing pin 168 towards spring 166, and into the end of seal bar 152, compresses spring 166. A compressive force by spring 166 opposes depression of pin 168.

Mounting block 160 is disposed adjacent to the end of seal bar 152 as shown in FIG. 8. A recess 170 in mounting block 160 loosely accepts and surrounds the head of bolt 162. A first edge 172 of mounting block 160 rests against pin 168. Sealing wire 130 is disposed over smooth face surface 154 of seal bar 152 extending lengthwise beyond the end of seal bar 152. Seal wire 130 has a first aperture 174 therethrough. Stud 176 protrudes from a second edge of mounting block 160 opposite first edge 172. First aperture 174 of seal wire 130 is positioned around stud 176 to fasten sealing wire 130 to mounting block 160.

Spring 166 via pin 168 and mounting block 160 communicate longitudinal tension to sealing wire 130. The end of sealing wire 130 opposite tension mechanism is fixed securely by the mechanism shown in FIG. 6 for securing the ends of sealing wire 130. A screw 180 extends through a second aperture 182 in sealing wire 130 and is secured into mounting block 160. Ring terminal 65 (not shown) is disposed between screw 180 and sealing wire 130 to establish an electrical continuity between sealing wire 130 and low resistance electrical lead 66. Alternatively, ring terminal 65 (not shown) is disposed under a second screw 184 secured within mounting block 160 and in contact with screw 180 internal to mounting block 160.

Figure 9:
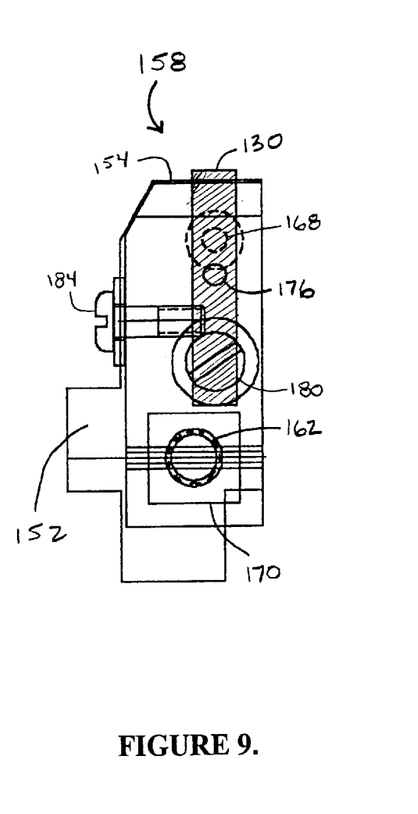
FIG. 9 is an end view of the tension mechanism for a seal bar assembly of the present invention.
Figure 10:
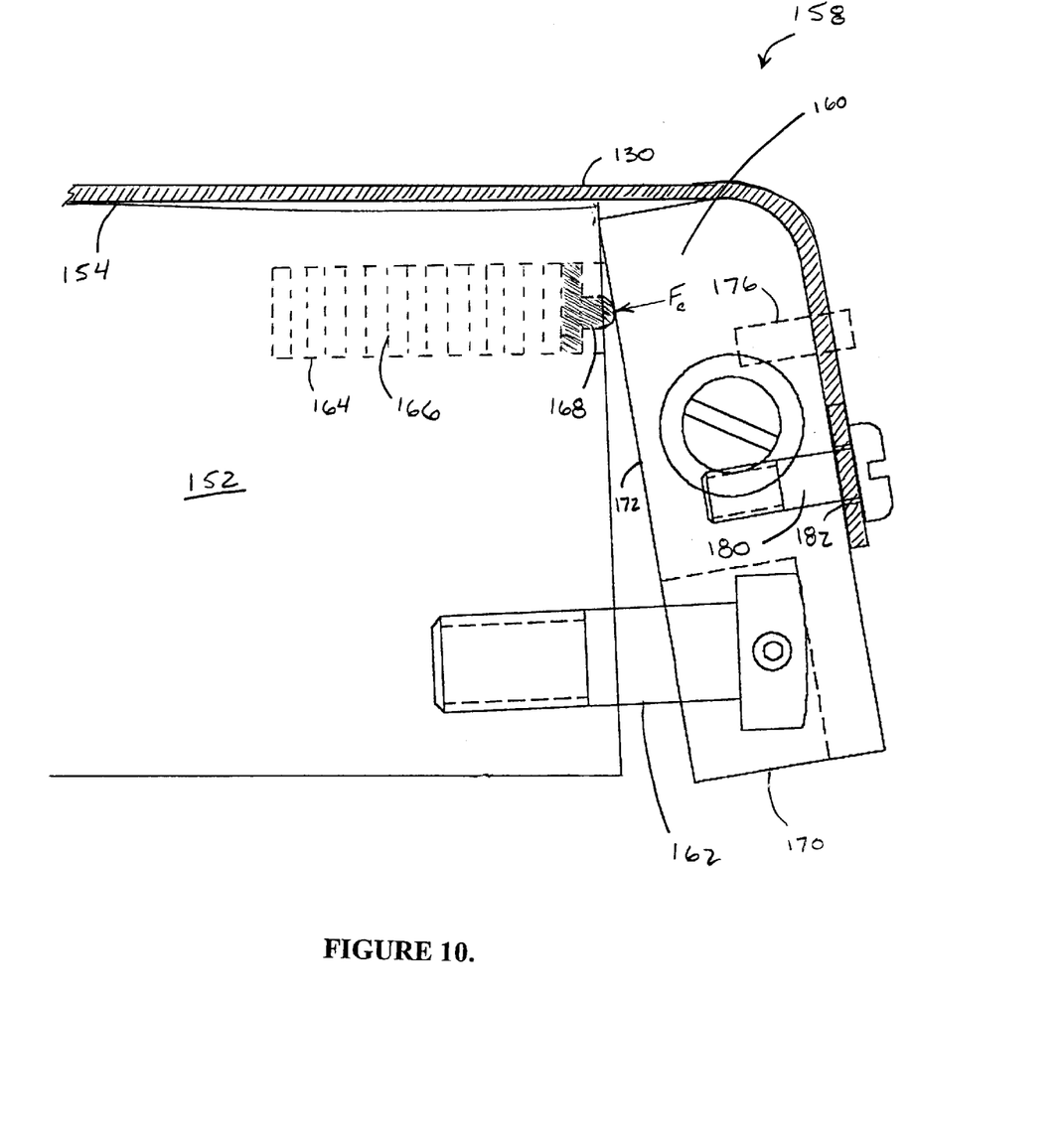
FIG. 10 is a side view of a tension mechanism for a seal bar assembly of the present invention in a tensioned condition.

FIG. 9 is an end view of tension assembly 158. FIG. 10 illustrates a side view of tension mechanism 158 when sealing wire 130 is in a thermally contracted, or cold, state. As sealing wire 130 contracts lengthwise, a force of contraction (indicated by arrow $F_C$ in FIG. 10) pulls mounting block 160 towards seal bar 152 compressing spring 166 through pin 168. Bolt 162 prevents mounting block 160 from moving upwards towards sealing wire 130. As sealing wire 130 heats and expands, the force of spring 166 opposing compressive force $F_C$ via pin 168 pushes first surface 172 of mounting block 160 away from the end of seal bar 152 to the position shown in FIG. 8. Alternative methods of tensioning sealing wire 130 are also contemplated. In an alternative embodiment, sealing wire 130 is mounted onto a seal bar using dual tension mechanisms, one located at each end of the seal bar.

In the preferred embodiment of seal bar assembly 158 shown in FIGS. 8 and 10, the total length of sealing wire 130 is approximately 19.8875 inches. Seal bar assemblies of various lengths depending on application, with appropriate adjustments in sealing wire length are contemplated. Sealing wire 130 is coated around its perimeter preferably with SILVERSTONE, the ends remaining un-coated. Black TEFLON is also an acceptable sealing wire 130 coating. Approximately 1.95 inches of the end of sealing wire 130 affixed to mounting block 160 is not coated with SILVERSTONE or TEFLON. Approximately 1.1875 inches of the opposite end of sealing wire 130 is also un-coated. Un-coated ends are copper plated to provide an efficient electrical coupling path.

A clamp support 60 is placed over slide 58 and sealing wire 54. A clamp 62 is placed over clamp support 60 and a pivot bolt 64 is disposed through the aligned apertures through clamp 62, clamp support 60, slide 58 and then a ring terminal 64 on one end of a low resistance electrical lead 66. A nut 68 is attached to pivot bolt 64 and tightened to establish electrical continuity between sealing wire 54 and electrical lead 66. At the other end of electrical lead 66 is a female spring clip terminal 68. Electrical lead 66 passes through a bundling strap 70 which is attached to the body of seal bar 32 via bolt 72 through spring washer 74.

Figure 11:
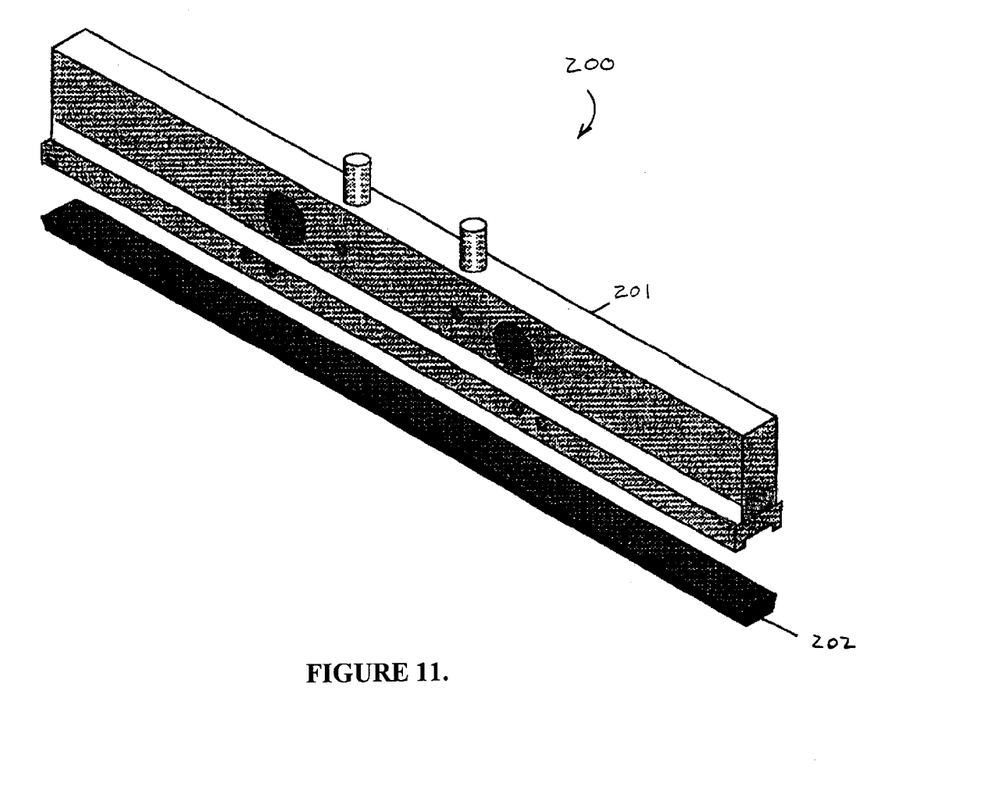
FIG. 11 is an exploded perspective view of a mating block assembly of the present invention.

FIG. 11 illustrates an seal bar mating assembly of the present invention, generally indicated at 201 comprising a body 201 and a silicon rubber layer 202. Silicon rubber layer 202 is affixed to body 201 using a silicon adhesive or Permatex or other suitable adhesive. Silicon rubber layer 202 eliminates the need for using TEFLON tape as a release layer since silicon is heat resistant in the temperature ranges contemplated with release characteristics comparable to TEFLON.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A seal bar assembly for use in an electrical impulse sealing machine in the food processing industry comprising:
    a seal bar made of polytetrafluoroethylene having a sealing surface extending longitudinally along a length of the seal bar;

a sealing wire positioned on the sealing surface and operably extending along the length of the seal bar;

a tension mechanism for tensioning the sealing wire to the sealing surface;

a seal bar mating assembly having a mating surface extending longitudinally along a length of the seal bar mating assembly, the mating surface configured to mate with the sealing surface during a sealing operation; and a mechanism configured to move the sealing surface of the seal bar relative to the mating surface of the seal bar mating assembly during a sealing operation, including controlled heating of the sealing wire.

2. The assembly of claim 1, the tension mechanism comprising:

a mounting block; and a spring operably positioned between the mounting block and the seal bar.

3. The assembly of claim 2, the tension mechanism comprising a securing mechanism for securing the sealing wire to the mounting block.

4. The assembly of claim 3, further comprising:

a bolt for securing the mounting block to the sealing bar.

5. The assembly of claim 2, wherein the mounting block is made of the same material as the seal bar.

6. The assembly of claim 2, where the sealing wire is configured as a double seam band.

7. The assembly of claim 1, further comprising a control system configured to provide a controlled impulse voltage to the sealing wire during operation of the seal bar.

* * * * *